(12) United States Patent
Lu et al.

(10) Patent No.: US 7,892,520 B2
(45) Date of Patent: Feb. 22, 2011

(54) SOLID-STATE SYNTHESIS OF IRON OXIDE NANOPARTICLES

(75) Inventors: Jun Lu, Lanzhou (CN); Ka Ming Ng, Hong Kong (CN); Shihe Yang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 467 days.

(21) Appl. No.: 11/878,864

(22) Filed: Jul. 27, 2007

(65) Prior Publication Data

US 2008/0181843 A1 Jul. 31, 2008

Related U.S. Application Data

(60) Provisional application No. 60/834,112, filed on Jul. 31, 2006.

(51) Int. Cl.
C01G 49/02 (2006.01)
(52) U.S. Cl. .......................... 423/634; 423/632; 423/633
(58) Field of Classification Search ................ 423/632, 423/633, 634
See application file for complete search history.

(56) References Cited

U.S. PATENT DOCUMENTS

| | | | |
|---|---|---|---|
| 3,215,572 A | 11/1965 | Papell | |
| 4,452,773 A | 6/1984 | Molday | |
| 4,827,945 A | 5/1989 | Groman et al. | |
| 4,951,675 A | 8/1990 | Groman et al. | |
| 5,219,554 A | 6/1993 | Groman et al. | |
| 5,262,176 A | 11/1993 | Palmacci et al. | |
| 5,322,756 A | 6/1994 | Ziolo | |
| 5,411,730 A | 5/1995 | Kirpotin et al. | |
| 5,424,419 A | 6/1995 | Hasegawa et al. | |
| 5,512,194 A * | 4/1996 | Ogasawara et al. | 252/62.56 |
| 5,858,595 A | 1/1999 | Ziolo | |
| 6,033,648 A | 3/2000 | Candau | |
| 6,123,920 A | 9/2000 | Gunther et al. | |
| 6,165,440 A | 12/2000 | Esenaliev | |
| 6,167,313 A | 12/2000 | Gray et al. | |
| 6,207,134 B1 | 3/2001 | Fahlvik et al. | |
| 6,423,296 B1 | 7/2002 | Gunther et al. | |
| 6,962,685 B2 | 11/2005 | Sun | |
| 7,128,891 B1 | 10/2006 | Sun | |
| 2005/0271593 A1 | 12/2005 | Yeh et al. | |
| 2006/0141149 A1 | 6/2006 | Chen et al. | |
| 2006/0204438 A1 | 9/2006 | Cho et al. | |
| 2007/0056401 A1 | 3/2007 | Sun | |
| 2007/0059775 A1 | 3/2007 | Hultman et al. | |

FOREIGN PATENT DOCUMENTS

| | | |
|---|---|---|
| WO | WO2004041008 | 5/2004 |
| WO | WO2005075059 | 8/2005 |

OTHER PUBLICATIONS

Randrianantoandro N.; Mercier A.M.; Hervieu M.; Greneche J.M. Direct phase transformation from hematite to maghemite during high energy ball milling. Materials Letters. vol. 47, No. 3, Jan. 2001. pp. 150-158.
Janot R.; Guerard D. One-step synthesis of maghemite nanometric powders by ball-milling. Journal of Alloys and Compounds, vol. 333, No. 1, Feb. 14, 2002 , pp. 302-307.
Lin, C.; Chu, Y.; and Wang, S. Magnetic properties of magnetite nanoparticles prepared by mechanochemical reaction. Materials Letters. vol. 60, Issue 4, Feb. 2006. pp. 447-450.
Bruce Parkinson, "*The emerging art of solid-state synthesis*" Science. Washington:Nov 17, 1995. vol. 270, Iss. 5239, p. 1157-1158.
Richard G. Blair and Richard B. Kaner, "*Solid-state metathesis materials synthesis*" ChemFiles, Sigma-aldrich. vol. 5, No. 13, p. 9.
Characterization and MRI study of surfactant-coated superparamagnetic nanoparticles administered into the rat brain. Journal of Magnetism and Magnetic Materials, vol. 225, Issues 1-2, 2001, pp. 256-261. D. K. Kim, Y. Zhang, J. Kehr, T. Klason, B. Bjelke and M. Muhammed.

* cited by examiner

*Primary Examiner*—Stanley Silverman
*Assistant Examiner*—James A Fiorito
(74) *Attorney, Agent, or Firm*—The Nath Law Group; Tanya E. Harkins; Mihsuhn Koh

(57) ABSTRACT

The present disclosure includes a method for preparing an aqueous dispersion of $\gamma$-$Fe_2O_3$ nanoparticles. The method includes grinding an iron (II) hydrated salt, an iron (III) hydrated salt, an inorganic salt, and alkali hydroxide in a grinding or milling machine. The inorganic salt may be a salt matrix that prevents growth and aggregation of the synthesized nanoparticles. The aqueous dispersion of $\gamma$-$Fe_2O_3$ nanoparticles may optionally be hydrothermally treated to become an aqueous dispersion of $\alpha$-$Fe_2O_3$ nanoparticles. Also disclosed is a method for preparing an mixture of $\alpha$-$Fe_2O_3$ nanoparticles and $\gamma$-$Fe_2O_3$ nanoparticles, in which at least an iron (III) hydrated salt, an inorganic salt, and alkali hydroxide are ground in a grinding or milling machine. Uses for the nanoparticles include: a magnetic resonance image contrast agent, a color print ink, an artificial tanning pigment, a photocatalyst for degradation of organic dye, a red pigment, an adsorbent for waste water treatment, a catalyst support, and a catalyst.

15 Claims, 5 Drawing Sheets

SOLID-STATE SYNTHESIS OF IRON OXIDE NANOPARTICLES

CROSS-REFERENCE TO RELATED APPLICATIONS

This application claims the benefit of U.S. Provisional Patent Application No. 60/834,112, filed Jul. 31, 2006, the contents of which are hereby incorporated by reference in their entirety.

BACKGROUND OF THE INVENTION

1. Field of the Invention

The present disclosure relates to the preparation of iron oxide nanoparticles in the form of an aqueous dispersion, as well as in the form of powder, by salt-assisted solid-state synthesis.

2. Related Art

The three most commonly used iron oxides are $\gamma$-$Fe_2O_3$ (Maghemite), $\alpha$-$Fe_2O_3$ (Hematite) and $Fe_3O_4$ (Magnetite). These iron oxides are known to have many important technological applications.

Magnetic iron oxide nanoparticle dispersions, commercially known as "Ferrofluid", have been used widely in, for example, rotary shaft sealing for vacuum vessels, oscillation damping for various electronic instruments, and position sensing for avionics, robotics, machine tool, and automotive (See U.S. Pat. No. 5,322,756; U.S. Pat. No. 5,858,595; K. Raj, R. Moskowitz, J. Magn. Magn. Mater., 85, 233 (1990)).

The use of iron oxide nanoparticles in clinical medicine is an important field in diagnostic medicine and drug delivery. Maghemite and magnetite nanoparticles, with particle size smaller than 20 nm, are superparamagnetic. These particles interfere with an external homogeneous magnetic field and can be positioned magnetically in a living body, facilitating magnetic resonance imaging (MRI) for medical diagnosis (see U.S. Pat. No. 6,123,920; U.S. Pat. No. 6,207,134; U.S. Pat. No. 5,424,419; U.S. Pat. No. 4,827,945; U.S. Pat. No. 6,423,296; and D. K. Kim, et al, J. Magn. Magn. Mater., 225, 256 (2001), the complete article is incorporated herein by reference in its entirety); C. C. Berry et al. Phys. D: Appl. Phys. 36, R198 (2003)), and AC magnetic field induced excitation for cancer therapy (see U.S. Pat. No. 6,165,440; U.S. Pat. No. 6,167,313, which is incorporated herein by reference in its entirety; A. Jordan, et al, J. Magn. Magn. Mater., 201, 413 (1999)). All of these medicinal and technological applications of magnetic iron oxide fluids require that the magnetic particle size is within the single domain size range and the overall particle size distribution is narrow so that the particles have uniform physical properties, biodistribution, bioelimination and contrast effects. For example, for medicinal applications, mean particle sizes should generally be in the range 2 to 15 nm and, for use as blood pool agents, the mean overall particle size including any coating materials should preferably be below 30 nm. However, producing particles with the desired size, acceptable size distribution, good aqueous dispersibility without particle aggregation has constantly been a problem.

Two methods have heretofore been generally used to produce iron oxide aqueous dispersions.

In the first method, a dispersion is prepared by milling, or by a so-called "mechanochemical" process. This solid-state synthesis is particularly suitable for large-scale production of nanostructured materials, because of its simplicity and low cost. It is, in general, most simply done by grinding an iron oxide in a suitable liquid vehicle in the presence of a dispersing agent or surfactant to obtain a stable colloidal. This method is known to have at least three problems. First, a typical grinding or milling operation can be a time-intensive process, and grinding or milling times of 120 hours or more are typically required to produce magnetic fluids. (See U.S. Pat. No. 3,215,572). Such long times are required to produce small enough particles to enable the formation of a stable colloid. Second, the choice of dispersing agents or surfactants is difficult, as the correct or enabling surfactant is often found through trial-and-error. Third, the surfactant may degrade or cause adverse chemical reactions during its application.

In one known application of this method, although organic solvent-free solid-state synthesis of maghemite nanoparticles with an average diameter of 15 nm was reported by high-energy ball-milling with iron powder and water (See R. Janot, et al. J. Alloy Comp. 333, 302 (2002)), at least 48 hours were needed for the milling process, and the product was severely aggregated. While milling in an ethanol medium can be used to produce maghemite from hematite (See N. Randriananatoandro, et al. Mater. Lett. 47,150 (2001)), the product is normally an undesirable mixture of hematite and maghemite phases. Lin et al. used anhydrous ferric and ferrous chlorides as reactants for the solid-state synthesis of magnetite nanoparticles with an average particle size of 14.8 nm, but again, the method suffered from a long milling time of over 72 hours. (See C. R. Lin, et al. Mater. Letts. 60,447 (2006)).

The second method, chemical precipitation of the nanoparticles, is probably the method most often used to prepare magnetic nanoparticles in colloids. Different procedures have been developed to achieve this goal. In general, each of these procedures start with a mixture of $FeCl_2$ and $FeCl_3$ and water. Co-precipitation occurs with the addition of sodium hydroxide or ammonium hydroxide, and then the system is subjected to different procedures for peptization, magnetic separation, filtration and finally dilution (See U.S. Pat. No. 4,452,773). The nanoparticles obtained by chemical precipitation are often modified by coating with a polymer or other surfactant as stabilizer in forming an aqueous dispersion. In fact, all Superparamagnetic Iron Oxide (SPIO) or Ultrafine Superparamagnetic Iron Oxide (USPIO) MRI contrast agents presently approved for clinical usage, as well as most of the contrast agents currently under development, are stabilized by the polymer dextran or its derivatives. (See A. H. Dutton, et al, Proc. Natl. Acad. Sci. USA 76, 3392 (1979)). Unfortunately, the polymer coating significantly increases the nanoparticles' overall sizes, and therefore may limit their tissue distribution, penetration, and metabolic clearance. Polymer-coated particles are often up-taken rapidly by the reticuloendothelial system, such as Kupffer cells of the liver. In general, the biodistribution of these polymer-based nanoparticles is mainly influenced by their size and surface chemistry (See R. Weissleder, et al, Radiology, 175, 489 (1990); F. Y. Cheng, et al, Biomaterials 26, 729 (2005)). It has been shown in the kinetic studies of the liver MR contrast agents that the particle's hydrodynamic size may play an important role: (See K. Lind, et al, J. Drug Target., 10, 221 (2002)). Larger polymer-coated SPIO particles (about 50 nm; e.g. Ferridex®, Berlex Lab., USA) were mainly trapped in the liver, while smaller sizes (about 30 nm; e.g. Combidex®, Advanced Magnetics, Cambridge, Mass.; Sinerem®, Laboratoire Guerbet, Fr) are useful for imaging the lymph node systems.

Thus, as described above, both known methods for producing iron oxide aqueous dispersions are either time-consuming, or involve surfactant contamination, or both. Attempts to rapidly produce an aqueous dispersion of SPIO or USPIO nanoparticles without the use of a surfactant have heretofore shown very limited success.

Various other known methods of producing iron oxide nanoparticles are problematic for the following reasons.

A number of patents and publications to Sun (U.S. Pat. No. 7,128,891; U.S. Pat. No. 6,962,685; U.S. Patent Application Publication No. 2007/0056401) describe methods in which an iron salt, alcohol, carboxylic acid, and amine are mixed in an ether solvent and heated to reflux. The mixture is then treated with ethanol, and the resulting powder is again dissolved in hexane in the presence of acid and amine, re-precipitated with ethanol, and then oxidized while being held at a temperature of 250° C. or 500° C., to produce $\gamma$-$Fe_2O_3$ or $\alpha$-$Fe_2O_3$ nanoparticles, respectively. This process requires repetition of an undesirable number of steps, and requires centrifugation to remove impurities and undesired precipitates.

U.S. Patent Application Publication No. 2005/0271593 to Yeh et al. describes a method of preparing water-soluble and dispersed $Fe_3O_4$ nanoparticles. The method involves mixing solutions containing $Fe^{2+}$ and $Fe^{3+}$ at pre-determined concentrations, adding organic acids as adherents, adjusting the pH value of the solution to produce a precipitate, again adding organic acids as adherents, and then adding water and an organic solvent to remove excess organic acid. Undesirably, this process requires the preparation of solutions containing $Fe^{2+}$ and $Fe^{3+}$ at pre-determined concentrations, and does not isolate $\gamma$-$Fe_2O_3$ from $\alpha$-$Fe_2O_3$ nanoparticles.

Similarly, U.S. Patent Application Publication No. 2006/0141149 to Chen et al. describes a method of forming a superparamagnetic nanoparticle. The method involves mixing aqueous solutions containing $Fe^{2+}$ and $Fe^{3+}$ ions with an alkalai, and then subjecting the mixture to ultrasonic vibration, to produce both $Fe_3O_4$ and $Fe_2O_3$ nanoparticles. Undesirably, this process requires the preparation of solutions containing $Fe^{2+}$ and $Fe^{3+}$ at pre-determined concentrations, and does not isolate $Fe_3O_4$, $\gamma$-$Fe_2O_3$, or $\alpha$-$Fe_2O_3$ nanoparticles.

U.S. Patent Application Publication No. 2007/0059775 to Hultman et al. describes a method of producing an iron oxide nanoparticle, in which iron pentacarbonyl is injected into a reaction mixture comprising oleic acid and trioctylamine. Undesirably, in order to be made water soluble, the resulting nanoparticles must be encapsulated in a phospholipid micelle. As in the methods described above, the encapsulation results in an undesirable enlargement of the size of the nanoparticles. Moreover, this encapsulation requires tedious preparation of the preselected micelle.

U.S. Patent Application Publication No. 2006/0204438 to Cho et al. describes a method of preparing water-soluble iron oxide nanoparticles. The method involves dissolving polyvinylprolidone in dimethylformamide, refluxing, heating, adding thereto iron pentacarbonyl; cooling, and then dialysis performed in an ultrapure nitrogen atmosphere. Undesirably, this process: requires long preparation times (the pentacarbonyl addition step requires two hours of stirring, and the dialysis step requires 24 hours to remove unreacted polymers and solvents); requires the use of an ultrapure nitrogen atmosphere; and, uses a solvent (dimethylformamide) known to be hazardous to humans and subject to dangerous exothermic decomposition.

SUMMARY OF THE INVENTION

The present subject matter addresses the above concerns by teaching the following methods and apparatuses.

The present disclosure includes a method for preparing $\gamma$-$Fe_2O_3$ nanoparticles. The method includes the step of grinding an iron (II) hydrated salt, an iron (III) hydrated salt, an inorganic salt, and alkali hydroxide, with optional additional elements, in a grinding or milling machine, to produce an aqueous dispersion of $\gamma$-$Fe_2O_3$ nanoparticles.

In some aspects, the iron (II) hydrated salt is iron (II) chloride tetrahydrate, iron (II) sulfate heptahydrate, iron (II) sulfate hydrate, iron (II) oxalate dihydrate, or a combination thereof. However, these are non-limiting examples, and many other iron (II) hydrated salts may be used.

In some aspects, the iron (III) hydrated salt is iron (III) chloride hexahydrate, iron (III) nitrate nonahydrate, iron (III) sulfate hydrate, iron (III) oxalate hexahydrate, or a combination thereof. However, these are non-limiting examples, and many other iron (III) hydrated salts may be used.

In some aspects, the inorganic salt is sodium chloride, potassium chloride, sodium sulfate, potassium sulfate, potassium nitrate, sodium nitrate, or a combination thereof. However, these are non-limiting examples, and may other inorganic salts may be used. In some aspects, the inorganic salt is a salt matrix that prevents growth and aggregation of the synthesized nanoparticles.

In some aspects, the molar ratio of the iron (III) hydrated salt to the iron (II) hydrated salt ranges from 4:1 to 1:4. However, this is a non-limiting example, and other ranges and weights may be used. In at least one aspect, the molar ratio of the iron (III) hydrated salt to the iron (II) hydrated salt is 2:1.

In some aspects, the weight ratio of the inorganic salt to the total weight of the iron (III) hydrated salt and the iron (II) hydrated salt ranges from 1:10 to 10:1. However, this is a non-limiting example, and other ranges and weights may be used. In at least one aspect, the weight ratio of the inorganic salt to the total weight of the iron (III) hydrated salt and the iron (II) hydrated salt is about 1:1. In another aspect, the weight ratio of the inorganic salt to the total weight of the iron (III) hydrated salt and the iron (II) hydrated salt is about 2:1. In yet another aspect, the weight ratio of the inorganic salt to the total weight of the iron (III) hydrated salt and the iron (II) hydrated salt ranges from 2:1 to 1:1.

In some aspects, the particle size of the $\gamma$-$Fe_2O_3$ nanoparticles is in the range of 0.5 nm-10 nm. However, this is a non-limiting example, and other ranges and sizes may be used. In at least one aspect, the particle size of the synthesized $\gamma$-$Fe_2O_3$ nanoparticles is in the range of 1 nm-5 nm.

In some aspects, the aqueous dispersion of $\gamma$-$Fe_2O_3$ nanoparticles is surfactant free. In some aspects, the aqueous dispersion of $\gamma$-$Fe_2O_3$ nanoparticles is non-toxic.

In some aspects, the aqueous dispersion of $\gamma$-$Fe_2O_3$ nanoparticles is sufficient for use as a magnetic resonance image contrast agent. In some aspects, the aqueous dispersion of $\gamma$-$Fe_2O_3$ nanoparticles is sufficient for use as a color print ink.

In some aspects, the method includes the optional additional steps of filtering the aqueous dispersion of $\gamma$-$Fe_2O_3$ nanoparticles and drying at a temperature ranging from room temperature to 150° C. under atmosphere or vacuum dried. In this way, a brown powder of $\gamma$-$Fe_2O_3$ nanoparticles is produced.

The present disclosure also includes a method for preparing an aqueous dispersion of $\alpha$-$Fe_2O_3$ nanoparticles. The method includes the step of grinding an iron (II) hydrated salt, an iron (III) hydrated salt, an inorganic salt, and alkali hydroxide, with optional additional elements, in a grinding or milling machine. The method further includes the step of hydrothermally treating the aqueous dispersion of $\gamma$-$Fe_2O_3$ nanoparticles to become an aqueous dispersion of $\alpha$-$Fe_2O_3$ nanoparticles.

In some aspects, the particle size of the $\alpha$-$Fe_2O_3$ nanoparticles is in the range of 10 nm-100 nm. However, this is a non-limiting example, and other ranges and sizes may be used. As a further non-limiting example, the particle size of the α-Fe$_2$O$_3$ nanoparticles may be in the range of 10 nm-40 nm. As a still further non-limiting example, the particle size of the α-Fe$_2$O$_3$ nanoparticles may be in the range of 20 nm-75 nm. As a yet further non-limiting example, the particle size of the α-Fe$_2$O$_3$ nanoparticles may be in the range of 30 nm-50 nm.

In some aspects, the aqueous dispersion of α-Fe$_2$O$_3$ nanoparticles is sufficient for use as an artificial tanning pigment.

The present disclosure also includes a method for preparing an mixture of α-Fe$_2$O$_3$ nanoparticles and γ-Fe$_2$O$_3$ nanoparticles. The method includes the step of grinding at least an iron (III) hydrated salt, an inorganic salt, and alkali hydroxide in a grinding or milling machine.

In some aspects, the iron (III) hydrated salt is iron (III) chloride hexahydrate, iron (III) nitrate nonahydrate, iron (III) sulfate hydrate, iron (III) oxalate hexahydrate, or a combination thereof. However, these are non-limiting examples, and many other iron (III) hydrated salts may be used.

In some aspects, the inorganic salt is sodium chloride, potassium chloride, sodium sulfate, potassium sulfate, potassium nitrate, sodium nitrate, or a combination thereof. However, these are non-limiting examples, and may other inorganic salts may be used. In some aspects, the inorganic salt is a salt matrix that prevents growth and aggregation of the synthesized nanoparticles.

In some aspects, the weight ratio of the inorganic salt to the iron (III) hydrated salt ranges from 1:10 to 10:1. However, this is a non-limiting example, and other ranges and weights may be used. In at least one aspect, the weight ratio of the inorganic salt to the iron (III) hydrated salt is about 1:1. In another aspect, the weight ratio of the inorganic salt to the iron (III) hydrated salt is about 2:1. In yet another aspect, the weight ratio of the inorganic salt to the iron (III) hydrated salt ranges from 2:1 to 1:1. In still yet another aspect, the weight ratio of the inorganic salt to the iron (III) hydrated salt ranges from 1:5 to 5:1.

In some aspects, the method includes a step of heating the α-Fe$_2$O$_3$ nanoparticles and γ-Fe$_2$O$_3$ nanoparticles at a temperature within the range of 300° C. to 1000° C., thereby obtaining a red powder. However, this is a non-limiting example, and other temperatures and ranges may be used.

In some aspects, the α-Fe$_2$O$_3$ nanoparticles and γ-Fe$_2$O$_3$ nanoparticles are sufficient for use as a photocatalyst for degradation of organic dye or pigment. In some aspects, the α-Fe$_2$O$_3$ nanoparticles and γ-Fe$_2$O$_3$ nanoparticles are sufficient for use as a red pigment. In some aspects, the α-Fe$_2$O$_3$ nanoparticles and γ-Fe$_2$O$_3$ nanoparticles are sufficient for use as an adsorbent for waste water treatment. In some aspects, the α-Fe$_2$O$_3$ nanoparticles and γ-Fe$_2$O$_3$ nanoparticles are sufficient for use as a catalyst support. In some aspects, the α-Fe$_2$O$_3$ nanoparticles and γ-Fe$_2$O$_3$ nanoparticles are sufficient for use as a catalyst.

BRIEF DESCRIPTION OF THE DRAWINGS

The features, nature, and advantages of the presently disclosed methods and apparatuses will become more apparent from the detailed description set forth below when taken in conjunction with the drawings in which like reference characters identify corresponding items throughout and wherein.

DETAILED DESCRIPTION

The present disclosure is drawn to a new time-saving solid-state reaction for the synthesis of ultrafine maghemite nanoparticles, which are not agglomerated, and which can be readily dispersed into an aqueous ferrofluid without the addition of any surfactants. The subject matter can be expanded to the synthesis of hematite nanoparticles. In one aspect, the present disclosure is drawn to a method for making an aqueous dispersion of γ-Fe$_2$O$_3$ nanoparticles by a solid-state reaction. Maghemite nanoparticles in the size ranging from 1 to 5 nm with a narrow size distribution may be obtained. Aqueous dispersion of α-Fe$_2$O$_3$ nanoparticles can be further obtained by hydrothermal treatment of an aqueous dispersion of γ-Fe$_2$O$_3$ nanoparticles.

The growth of particles is believed to be inhibited by-salts produced in the solid state reaction. As a non-limiting example, KCl and several water molecules are produced in the reaction, and the "precipitation" of these salts is believed to lead to the formation of "walls" of salt and water surrounding the nanoparticles, to keep them from growing into large particles and further to prevent agglomeration. Further more, the abundant hydroxyl groups and the negative charges formed in the synthesis process are believed to make these particles readily dispersible into aqueous ferrofluid.

The hydrate iron (II and III) chlorides are used for reactants in this solid-state reaction. Most hydrated metal salts have point structures with defects and relatively lower lattice energies; in contrast, anhydrous metal salts usually have extended one- or two-dimensional structures. Exchange of crystalline (or coordinated) water is believed to increase the number of defects or interfacial diffusion, or to open the coordination sites for attack, and thus reduce the activation energy and increase the reaction rates. The above reasons are believed to allow the presently disclosed methods to proceed more quickly than other methods of synthesizing iron oxide nanoparticles.

Figure 1:
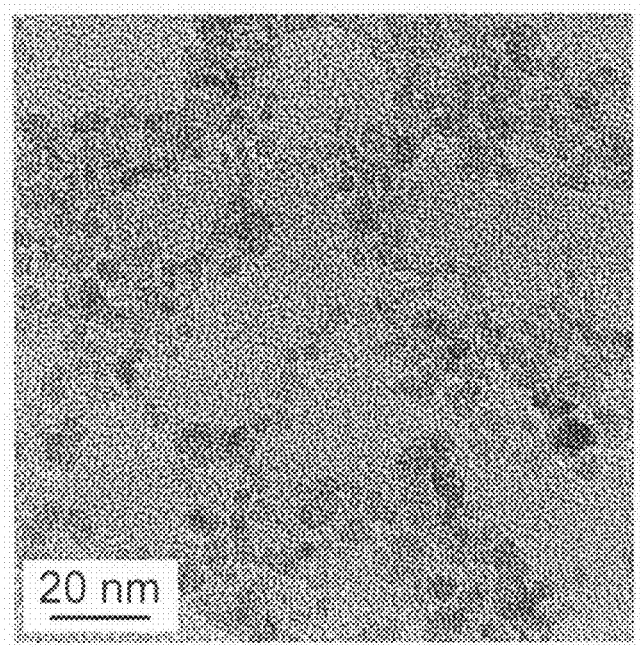
FIG. 1 is a Transmission Electron Microscopy (TEM) image of γ-Fe$_2$O$_3$ obtained from an aqueous dispersion according to the present disclosure, and according to the conditions set forth in Example 1.

Making reference to FIG. 1, aqueous dispersions of $\gamma$-$Fe_2O_3$ nanoparticles were prepared in accordance with the present disclosure by milling a mixture of iron (II) chloride tetrahydrate, iron (III) chloride hexahydrate, and potassium chloride, and then adding potassium hydroxide and milling for an additional 30 minutes in a mortar. Repeated washing followed after milling until no $Cl^-$ ion were detected. FIG. 1 shows a TEM image of the $\gamma$-$Fe_2O_3$ nanoparticles in an aqueous dispersion according to the presently disclosed methods. It can be seen that the colloid is well dispersed, and that the aggregation therein is minimal. The particles are almost spherical, with ultrafine sizes. The particle size and size distribution analyses were carried out by measuring diameters of 100 particles selected randomly from an appropriate TEM images. An average particle size and standard deviation ($\sigma$) of 2.9 nm and 0.7 nm, respectively, were observed. In some aspects, the aqueous dispersions were transparent.

The aqueous dispersion of the as-synthesized iron oxide nanoparticles comes from the abundant hydroxyl groups on the surface of the nanoparticles. These hydroxyl groups are released in the synthesis process, and not by way of an additional water rinse. Accordingly, the milling process begins with solid-state ingredients, and ends with a moisture-solid-state mixture. Although an optional wash in DDI water may be performed, such a wash is generally not necessary, and moreover, a DDI wash will produce an aqueous dispersion only when $Cl^-$ ion concentration is low, in part for the following reason. Electrostatic repulsion between positively and negatively charged nanoparticles is believed to be one mechanism by which a colloidal solution thereof is kept stable even at a high concentration. Hydrous iron oxides have an amphoteric character, and the Fe—OH sites on the maghemite nanoparticle surfaces may react with either $H^+$ or $OH^-$ ions from dissolved acids or bases, leading to positive (Fe—$OH_2^+$) or negative (Fe—$O^-$) charges. In other words, the charges develop on the surface depending on the pH of the electrolyte solution:

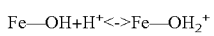

or

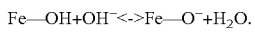

Accordingly, the electrostatic repulsion between positively and negatively charged nanoparticles is believed to keep the colloidal solution stable even at a high concentration. When the $Cl^-$ ion concentration is high, the electrostatic repulsion between charged nanoparticles is low, and an aqueous dispersion may under these conditions be difficult to obtain, particularly under a DDI wash.

Figure 2:
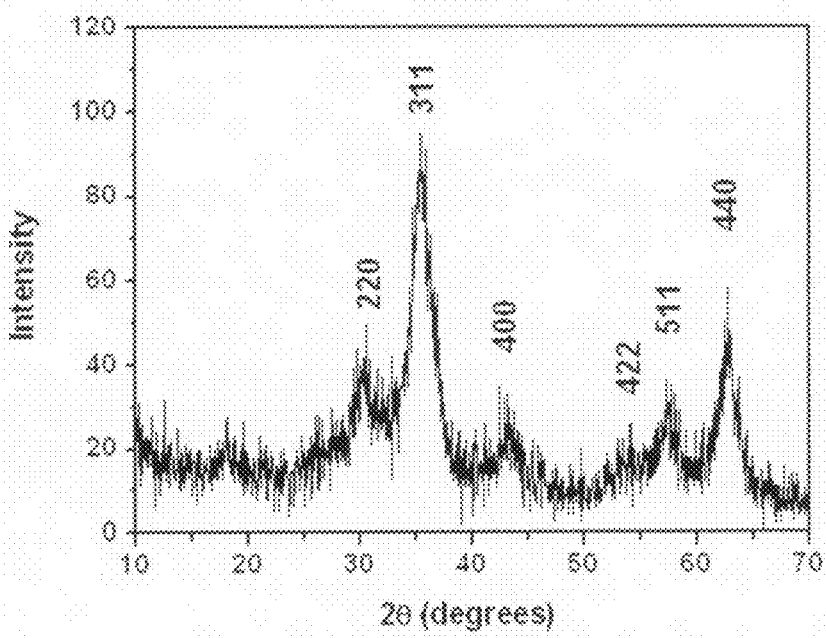
FIG. 2 is an X-ray Diffraction (XRD) pattern of an γ-Fe$_2$O$_3$ powder according to the present disclosure, and prepared according to the conditions set forth in Example 2.

FIG. 2 is an XRD pattern revealing a structural characterization of a powder of maghemite nanoparticles obtained by the above method. Diffraction peaks, here shown with characteristic indices (220), (311), (400), (422), (440), and (511), are readily recognized from the XRD pattern. The observed diffraction peaks agree well with the tetragonal structure of maghemite (JCPDS file No. 25-1402). It is clear that no other phases except the maghemite are detectable. The broadening of the peaks indicates the small crystalline sizes of the nanoparticles, which is translated into an average core size of 2.7 nm using the Debye-Scherrer formula for spherical particles.

The structural data presented above have revealed some favorable characteristics of maghemite nanoparticles produced according the claimed method, including ultrafine particle size and narrow particle size distribution and, at the same time, the good crystallinity and phase purity. These excellent properties make the maghemite MIONs a good candidate for the potential application as a MRI contrast agent, and for use in specific tissue imagine techniques. In order to investigate the magnetic properties of the as-synthesized nanoparticles, a VSM measurement was carried out.

Figure 3:
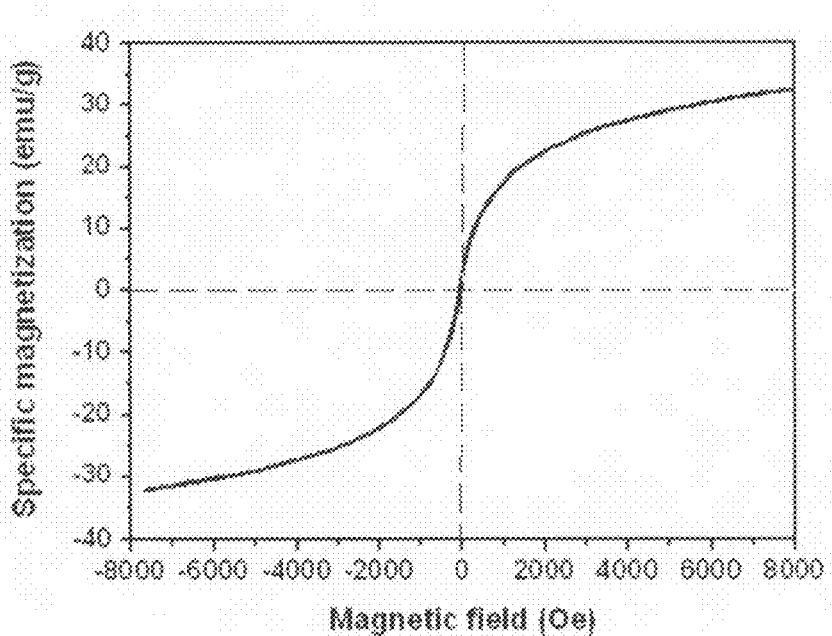
FIG. 3 is a magnetization curve for an γ-Fe$_2$O$_3$ powder according to the present disclosure, and prepared according to the conditions set forth in Example 2.

FIG. 3 illustrates a magnetization curve of a powder of maghemite nanoparticles, prepared according to the presently disclosed methods, measured at room temperature. This powder was obtained by filtering and vacuum-drying of the sample shown in (and described with respect to) FIGS. 1 and 2. The as-synthesized maghemite nanoparticles display a superparamagnetic behavior, as evidenced by a zero coercivity and remnance on the magnetization loop. The sample could not be magnetically saturated at the magnetic field limit of our VSM (1 T). The magnetization value obtained at 9000 Oersteds was 34.7 emu/g, which is quite close to those of the $Fe_3O_4$ nanoparticles protected by $(N(CH_3)_4OH)$ (40 emu/g) reported previously (see F. Y. Cheng, et al, Biomaterials 26, 729 (2005)) and the MIONs used for MRI CAs by Weissleder et al (see R. Weissleder, et al, Radiology, 175, 489 (1990)). However, it is much lower than the saturation magnetization of bulk maghemite ($M_s$=76 emu/g) (see F. Montagnea, et al, J. Magn. Magn. Mater. 250,302 (2002)), which could be explained by the small-particle surface effect and the internal cation disorder (see B. Martinez, et al, Phys. Rev. Lett. 80,181 (1998); S. Yu, et al, J. Mater. Chem. 14,2781 (2004)).

Maghemite nanoparticles prepared according to the present disclosure are useful not only in the field of MRI, but also in hyperthermic treatment, cell-separation, and drug delivery. Moreover, these maghemite nanoparticles have other important applications as pigments and catalysts.

As pigments, iron oxides such as those prepared according to the disclosed method have a number of desirable attributes. They display a range of colors with pure hues and high tinting strength. They are extremely stable, i.e. non-bleeding, non-fading, and highly resistant to acids and alkalis, and can therefore be exposed to outdoor conditions. The pigments can be used in both water- and organic-based paints. Iron oxides are strong ultraviolet (UV) absorbers and hence protect the binder in the paint from degradation. As iron oxides are non-toxic and, as the synthetic ones are completely free from crystalline $SiO_2$, they can be used as coloring agents in food and in some pharmaceuticals (see R. M. Cornell, U. Schwertmann, The Iron Oxides, WILEY-VCH Weinheim, Germany, 2003, p. 511). As set forth in U.S. Pat. No. 6,033,648, Candau et al. has used iron oxide nanopigment particulates ranging from 10 nm to 30 nm in artificial tanning compositions. In one aspect of the present disclosure, an aqueous colloid of hematite nanoparticles is produced, which is surfactant free and may thus be directly added into artificial tanning compositions.

In the field of catalysts, iron oxide is often used as a catalyst support on which precious metal nanoparticles are embedded (see WO2005075059; WO2004041008; J. K. Edwards, et al. J. Mater. Chem. 15,4595 (2005); T. Schalow, et al. Catal. Lett. 107, 189 (2006)). One such process in which the presently disclosed iron oxide particles may be used in the room-temperature conversion of CO to $CO_2$ by an Au/$Fe_2O_3$ catalyst. Maghemite nanoparticles synthesized by the presently disclosed method have a BET surface area of 215.49 $m^2$/g, making materials which are ideal catalyst supports. Iron oxides can even be used as a catalyst for the degradation of organic dyes (see F. Herrera, et al. Appl. Catal. B: Environ. 29,147 (2001)). As a non-limiting example, iron oxide nanoparticles produced according to the present disclosure have been successfully used as photocatalysts for degradation of Orange II.

Figure 4:
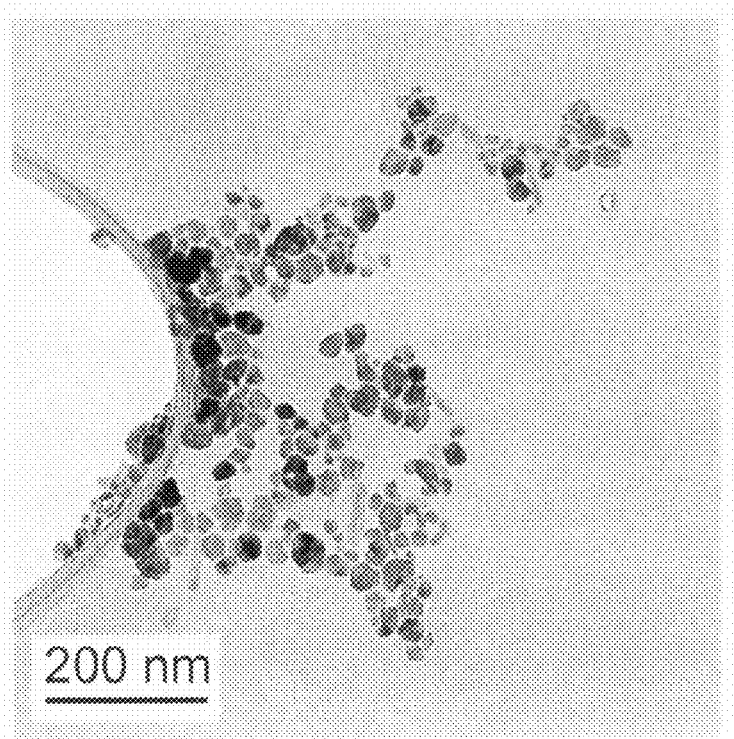
FIG. 4 is a TEM image of α-Fe$_2$O$_3$ from an aqueous dispersion according to the present disclosure, and prepared according to the conditions set forth in Example 6.
Figure 5:
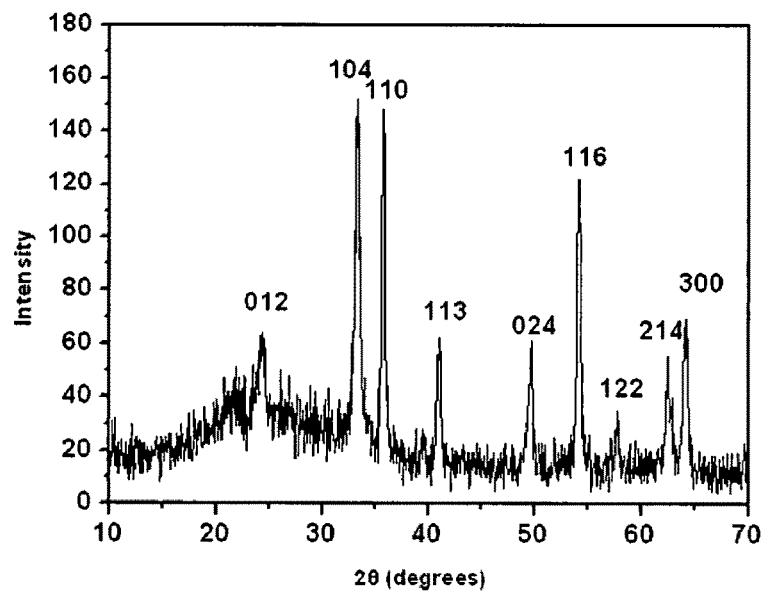
FIG. 5 is an XRD pattern of an α-Fe$_2$O$_3$ powder obtained by hydrothermal treatment according to the present disclosure, and prepared according to the conditions set forth in Example 6.
Figure 6:
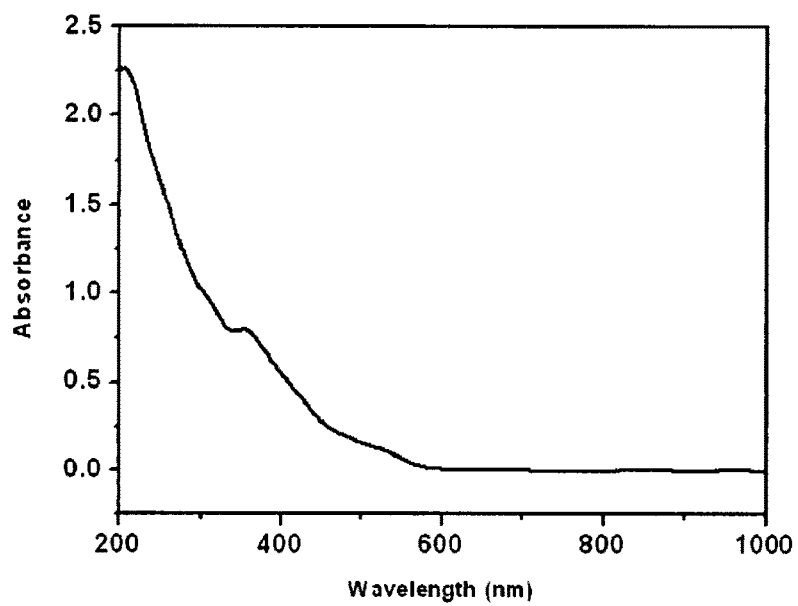
FIG. 6 is the UV-spectra of a α-Fe$_2$O$_3$ colloid obtained by a method according to the present disclosure, and prepared according to the conditions set forth in Example 6.

According to another aspect of the present disclosure, a method of salt-assisted solid-state synthesis is disclosed, for conversion from maghemite to hematite. Hematite dispersions are shown in FIGS. 4, 5, and 6. In the field of pigment and photocatalyst, hematite is the most commonly used form of iron oxide because it is the most stable form of all iron oxides (hydroxides). Hydrothermal treatment of the aqueous dispersions γ-$Fe_2O_3$ nanoparticles makes the γ-$Fe_2O_3$ nanoparticles change to α-$Fe_2O_3$ nanoparticles. One hydrothermal condition identified at which this may occur is treatment at 120° C. and for 24 hours. Another hydrothermal condition identified at which this may occur is treatment at 120° C. and for 48 hours. Shorter hydrothermal treatment times can result in smaller particle sizes, but with broad particle size distribution and the formation of some nanorods of hematite.

FIG. 4 shows a TEM image of α-$Fe_2O_3$ nanoparticles in aqueous dispersion obtained according to the presently disclosed methods, whose particle sizes are in the range of 10 to 40 nm with a mean diameter of 20 nm.

FIG. 5 is an XRD pattern of α-$Fe_2O_3$ powder obtained according to the presently disclosed methods of hydrothermal treatment. All the peaks, here shown with characteristic index numerals, can be assigned to hematite.

FIG. 6 shows the UV-spectra of a α-$Fe_2O_3$ colloid obtained according to the present disclosure. In this spectra, it may be seen that the colloid has excellent UV absorbance, especially when the wave-length is smaller than 350 nm.

Figure 7:
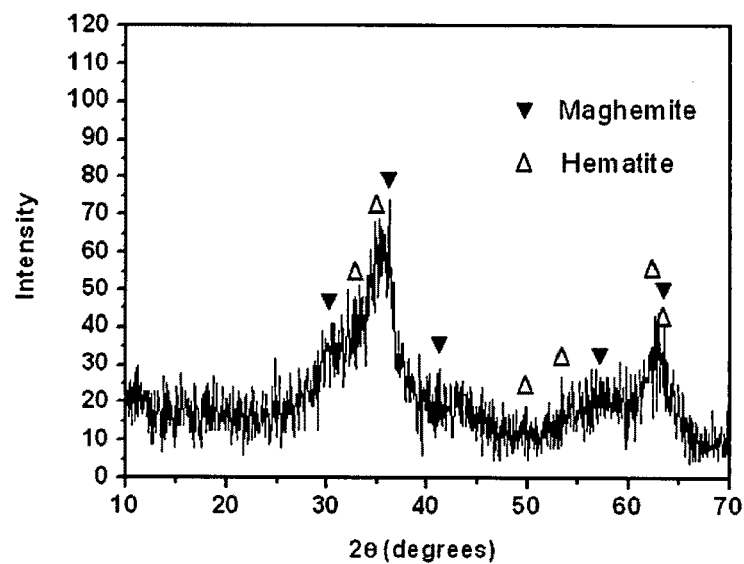
FIG. 7 shows XRD patterns of hematite and maghemite power obtained by a method according to the present disclosure, and according to the conditions set forth in Example 3.

According to another aspect of the present disclosure, and as shown in FIG. 7, iron oxide nanoparticles which are not well-crystallized may be prepared as follows. Milling of a mixture of iron (III) chloride hexahydrate, potassium chloride and potassium hydroxide occurs in a mortar. Repeated washing follows after milling, until no Cl⁻ ion can be detected. After washing, vacuum drying occurs at (as a non-limiting example) 50° C. for 6 hours. At this point, a red-brown powder of $Fe_2O_3$ nanoparticles is obtained.

FIG. 7 thus shows an XRD pattern of a powder of iron oxide nanoparticles obtained according to the above method. It may be seen that the diffraction peaks are very weak and are not very well separated. Both hematite and maghemite diffraction peaks may be found in the XRD pattern, which demonstrate that the powder is a mixture of hematite and maghemite. The BET surface area of this powder is 201.46 $m^2/g$.

Figure 8:
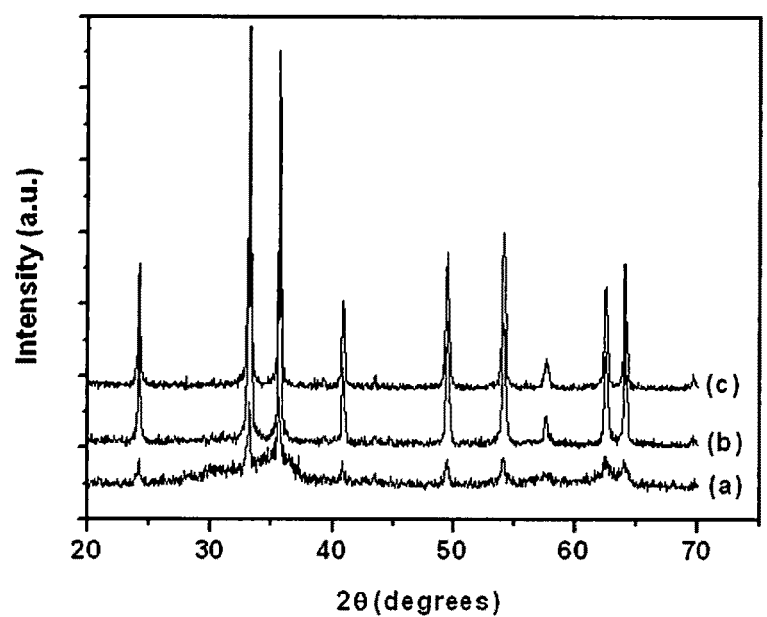
FIG. 8 shows XRD patterns of: (a) H300; (b) H-450; and (c) H-600, obtained by methods according to the present disclosure, and according to the conditions set forth in Example 4.
Figure 9:
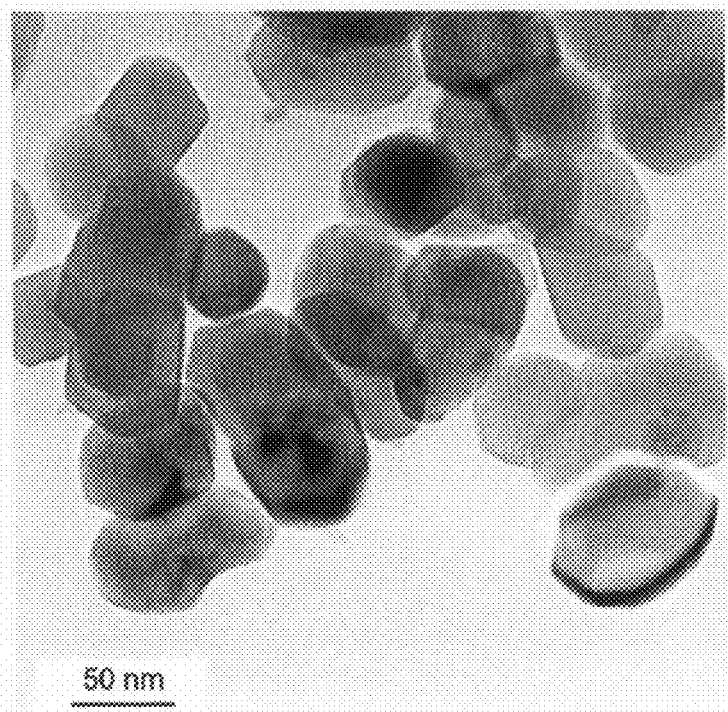
FIG. 9 is a TEM image of H-600 nanoparticles obtained by a method according to the present disclosure, and according to the conditions set forth in Example 4.
Figure 10:
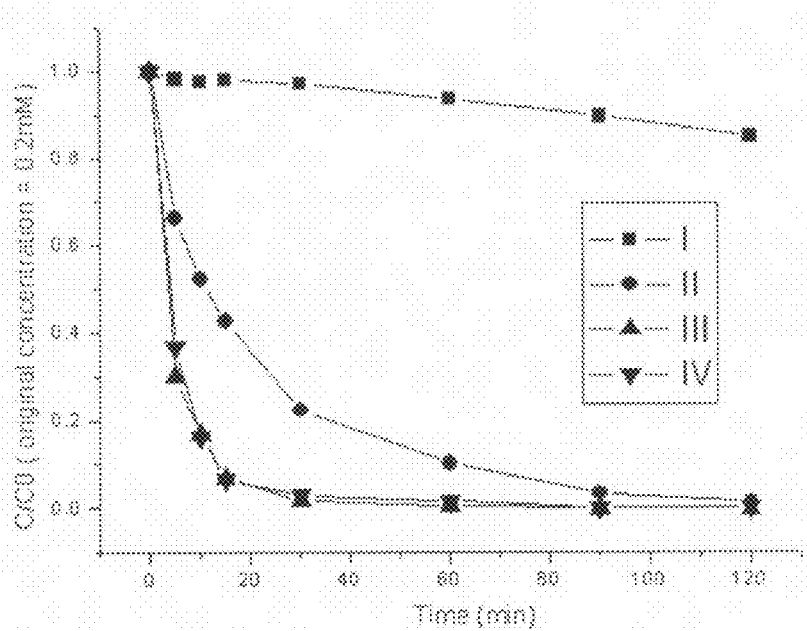
FIG. 10 plots a concentration versus time curve for photocatalytic degradation of Orange II with iron oxide nanoparticles as catalyst, the nanoparticles obtained by a method according to the present disclosure, and the test conducted according to the conditions set forth in Example 5. The sample of curve III is prepared according to the conditions set forth in Example 3, while the sample of curve IV is prepared according to the conditions set forth in Example 4.

The obtained mixture of γ-$Fe_2O_3$ nanoparticles and α-$Fe_2O_3$ nanoparticles may further be calcinated at different temperatures, as shown in FIGS. 8-10. When calcinated at 300° C., 450° C. and 600° C., red powders of α-$Fe_2O_3$ nanoparticles with different particle sizes are obtained. These powders are named H-300, H-450 and H-600 respectively. Their BET surface areas are 159.78, 51.51 and 15.22 $m^2/g$ respectively.

FIG. 8 shows an XRD pattern of hematite nanoparticles obtained at different temperatures as described above. Spectrum (a) was obtained for H-300, spectrum (b) was obtained for H-450, and spectrum (c) was obtained for H-600.

FIG. 9 is a TEM image of only H-600 hematite nanoparticles.

FIG. 10 graphs the curve of concentration vs. time for a photocatalytic reaction in the degradation of Orange II, using a powder of $Fe_2O_3$ (mixture of hematite and maghemite) nanoparticles and α-$Fe_2O_3$ particles in room temperature under the irradiation of UV light, according to the present disclosure. Curve I plots the degradation of Orange II under exposure to 8 Watts of UVC light. Curve II plots the degradation of Orange II under exposure to 8 Watts of UVC light, under the presence of 10 mM of $H_2O_2$, but without any catalyst. Curve III plots the degradation of Orange II under exposure to 8 Watts of UVC light, under the presence of 10 mM of $H_2O_2$, with the additional presence of 1.0 grams of $Fe_2O_3$/L (the $Fe_2O_3$ nanoparticles are a mixture of hematite and maghemite). Curve IV plots the degradation of Orange II under exposure to 8 Watts of UVC light, under the presence of 10 mM of $H_2O_2$, with the additional presence of 1.0 grams of H-300 $Fe_2O_3$/L, as described above. This reaction, in which the iron oxide nanoparticles serve as a catalyst, is described in greater detail in Example 5 below.

EXAMPLES

Example 1

Mixed solid powders of $FeCl_3 \cdot 6H_2O$ (0.005 mol, 1.35 g), $FeCl_2 \cdot 4H_2O$ (0.0025 mol, 0.50 g) and KCl (3.7 g) were ground in a mortar for 30 min at room temperature. After grinding, the mixture appeared as a yellow paste. KOH powder (0.02 mol, 1.22 g) was then added to the mortar and ground for another 30 min at room temperature. In the first tens of seconds, a lot of vapor and heat were notably released. After grinding, the mixture became a black solid. This black solid was then repeatedly washed with DDI water by stirring, sonication, and filtering, until no Cl⁻ ion could be detected. In this way, an aqueous colloid of γ-$Fe_2O_3$ nanoparticles was synthesized. The prepared sample may be seen in FIG. 1.

Example 2

The colloid sample in example 1 was collected by use of a 0.1 μm membrane as solid and then vacuum dried at 50° C. for 6 hours. A brown powder of γ-$Fe_2O_3$ nanoparticles was obtained, which weighed 0.49 g with a yield of 81%. The prepared sample may be seen in FIGS. 2 and 3.

Example 3

Mixed solid powders of $FeCl_3 \cdot 6H_2O$ (0.01 mol, 2.7 g), and KCl (5.4 g) were ground in a mortar for 30 min at room temperature. KOH powder (0.03 mol, 1.68 g) was then added to the mortar and ground for another 30 min at room temperature. The mixture was then repeatedly rinsed with DDI water until no Cl⁻ ion could be detected. In this way, the aqueous colloid of iron oxide nanoparticles was synthesized. After washing, the colloid was further vacuum dried at 50° C. for 6 hours. A brown power of $Fe_2O_3$ nanoparticles, as a mixture of hematite and maghemite, was thus obtained. The prepared sample may be seen in FIG. 7, and is represented by curve III in FIG. 10.

Example 4

A powder of $Fe_2O_3$ nanoparticles (a mixture of hematite and maghemite, as described above in example 3) was calcinated at different temperatures at 300° C., 450° C. and 600° C., red powders of α-$Fe_2O_3$ nanoparticles with different particle sizes were obtained. These powders were designated as H-300, H-450 and H-600, and their mean particle sizes were determined to be 15.6 nm, 34.9 nm and 38.1 nm respectively, as calculated by the Debye-Scherrer formula for spherical particles from the XRD patterns. All three prepared samples may be seen in FIG. 8, where the XRD patterns of (a) (b) and (c) correspond to H-300, H-450, and H-600, respectively. The sample shown in FIG. 9 is H-600, and curve IV in FIG. 10 represents H-300.

Example 5

When the powder of $Fe_2O_3$ (mixture of hematite and maghemite) nanoparticles and the $\alpha$-$Fe_2O_3$ particles were used for photocatalytic reaction in room temperature under the irradiation of UV light, they act as good photocatalysts in the degradation of Orange II. FIG. 10 shows this photocatalytic reaction. The original concentration of Orange II was 0.2 mM. The data was collected between 0 to 120 minutes. In the case of I, only UV light was used with a power of 8 W; In the case of II, 10 mM $H_2O_2$ was added with UV light irradiation but without any catalyst; In the case of III, besides UV light and $H_2O_2$, 1.0 g $Fe_2O_3$ (mixture of hematite and maghemite) was added; In the case of IV, besides UV light and $H_2O_2$, 1.0 g H-300 was added. It is clear that with the addition of $Fe_2O_3$ (mixture of hematite and maghemite) and H-300, the concentration curves drop quickly, compared with curves I and II, which means that the samples of $Fe_2O_3$ (mixture of hematite and maghemite) and H-300 produced according to the above methods have good catalytic properties for photo-degradation of organic dyes.

Example 6

The colloid sample in example 1 was subjected to hydrothermal treatment at 120° C. for 48 hours. An aqueous dispersion of $\alpha$-$Fe_2O_3$ nanoparticles was obtained. A TEM image of the prepared sample may be seen in FIG. 4. This dispersion was then filtered and vacuum-dried for the purposes of performing an XRD analysis, the results of which are shown in FIG. 5 and confirm the presence of $\alpha$-$Fe_2O_3$.

ADVANTAGES

Generally, the presently disclosed methods are believed to hold numerous advantages over conventional ways of preparing maghemite nanoparticles, such as coprecipitation, microemulsions, high temperature decomposition of organic precursors, and oxidization of magnetite nanoparticles. The known methods have the disadvantages of the need to use expensive organic precursors as starting materials, tedious washing procedures for surfactants, or particle aggregations during high temperature oxidation in the air, and generally produce particles of large size.

In distinction, the presently disclosed methods allow for a mechanochemical processing which is an organic solvent-free process, and thus ecologically clean. The presently disclosed solid-state synthesis is particularly suitable for large-scale production because of its simplicity and low cost. The presently disclosed method, salt-assisted solid-state synthesis, makes ultrafine maghemite nanoparticles with small particle size, pure phase, good crystallinity and excellent aqueous dispersibility. Further, the presently disclosed method avoids the disadvantage of a long milling time, which leads to high energy consumption and impurity. The use of hydrate iron (II and III) chlorides as reactants reduces the activation energy and increases the reaction rates, thus, shortening solid-state reaction time. Further, the abundant hydroxyl groups and the negative charges formed in the disclosed synthesis process make these particles readily dispersible into aqueous ferrofluid.

The previous description of some aspects is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. Thus, the present invention is not intended to be limited to the aspects shown herein but is to be accorded the widest scope consistent with the principles and novel features disclosed herein.

What is claimed is:

1. A method for preparing $\gamma$-$Fe_2O_3$ nanoparticles comprising:
   grinding together at least an iron (II) hydrated salt, an iron (III) hydrated salt, an inorganic salt and alkali hydroxide, in a grinding or milling machine, said grinding step producing an aqueous dispersion of single phase $\gamma$-$Fe_2O_3$ nanoparticles,
   filtering the aqueous dispersion of $\gamma$-$Fe_2O_3$ nanoparticles, and
   drying the aqueous dispersion of $\gamma$-$Fe_2O_3$ nanoparticles at a temperature ranging from room temperature to 150° C., said drying step producing a brown powder of $\gamma$-$Fe_2O_3$ nanoparticles.

2. The method of claim 1, wherein the iron (II) hydrated salt is selected from the group consisting of: iron (II) chloride tetrahydrate, iron (II) sulfate heptahydrate, iron (II) sulfate hydrate, iron (II) oxalate dihydrate, and combinations thereof.

3. The method of claim 1, wherein the iron (III) hydrated salt is selected from the group consisting of: iron (III) chloride hexahydrate, iron (III) nitrate nonahydrate, iron (III) sulfate hydrate, iron (III) oxalate hexahydrate, and combinations thereof.

4. The method of claim 1, wherein the inorganic salt is selected from the group consisting of: sodium chloride, potassium chloride, sodium sulfate, potassium sulfate, potassium nitrate, sodium nitrate, and combinations thereof.

5. The method of claim 1, wherein the inorganic salt is a salt matrix that prevents growth and aggregation of the synthesized nanoparticles.

6. The method of claim 1, wherein the molar ratio of the iron (III) hydrated salt to the iron (II) hydrated salt ranges from 4:1 to 1:4.

7. The method of claim 1, wherein the weight ratio of the inorganic salt to the total weight of the iron (III) hydrated salt and the iron (II) hydrated salt ranges from 1:10 to 10:1.

8. The method of claim 1, wherein the particle size of the $\gamma$-$Fe_2O_3$ nanoparticles is in the range of 0.5 nm-10 nm.

9. The method of claim 1, wherein the aqueous dispersion of $\gamma$-$Fe_2O_3$ nanoparticles is surfactant free and non-toxic.

10. The method of claim 1, wherein the aqueous dispersion of $\gamma$-$Fe_2O_3$ nanoparticles is sufficient for at least one use selected from the group consisting of: a magnetic resonance image contrast agent, and a color print ink.

11. A method for preparing $\gamma$-$Fe_2O_3$ nanoparticles comprising:
    grinding together at least an iron (II) hydrated salt, an iron (III) hydrated salt, an inorganic salt and alkali hydroxide, in a grinding or milling machine,
    wherein the grinding step produces an aqueous dispersion of single phase $\gamma$-$Fe_2O_3$ nanoparticles, and the grinding or milling time is less than 45 hours.

12. The method of claim 11, wherein the particle size of $\gamma$-$Fe_2O_3$ nanoparticles ranges from 1 to 5 nm.

13. A method for preparing α-Fe$_2$O$_3$ nanoparticles comprising:

hydrothermally treating the aqueous dispersion of single phase γ-Fe$_2$O$_3$ nanoparticles of claim 11 to obtain an aqueous dispersion of α-Fe$_2$O$_3$ (hematite) nanoparticles.

14. The method of claim 12, wherein the particle size of α-Fe$_2$O$_3$ nanoparticles is in the range of 10 to 100 nm.

15. The method of claim 12, wherein the aqueous dispersion of α-Fe$_2$O$_3$ nanoparticles is sufficient for use as an artificial tanning pigment.

* * * * *